United States Patent
Bhatt et al.

(10) Patent No.: US 12,168,363 B2
(45) Date of Patent: Dec. 17, 2024

(54) DIGITAL PEN CAP

(71) Applicant: Analog Devices International Unlimited Company, Limerick (IE)

(72) Inventors: Nayan Bhatt, Surat (IN); Alekhya Kosaraju, Milton (CA); Cindralla George, Adimali (IN)

(73) Assignee: ANALOG DEVICES INTERNATIONAL UNLIMITED COMPANY, Limerick (IE)

( * ) Notice: Subject to any disclaimer, the term of this patent is extended or adjusted under 35 U.S.C. 154(b) by 0 days.

(21) Appl. No.: 18/343,115

(22) Filed: Jun. 28, 2023

(65) Prior Publication Data

US 2024/0001706 A1 Jan. 4, 2024

Related U.S. Application Data

(60) Provisional application No. 63/357,807, filed on Jul. 1, 2022.

(51) Int. Cl.
*B43K 23/12* (2006.01)
*B43K 29/08* (2006.01)
*G06F 3/0346* (2013.01)
*G06F 3/0354* (2013.01)
*G06N 20/10* (2019.01)

(52) U.S. Cl.
CPC ............. *B43K 23/12* (2013.01); *B43K 29/08* (2013.01); *G06F 3/0346* (2013.01); *G06F 3/03545* (2013.01); *G06N 20/10* (2019.01)

(58) Field of Classification Search
CPC ... G06F 3/03545; G06F 3/0346; B43K 29/08; B43K 23/08; B43K 23/12
USPC .......................................................... 345/179
See application file for complete search history.

(56) References Cited

U.S. PATENT DOCUMENTS

| | | | | |
|---|---|---|---|---|
| 5,957,608 A | * | 9/1999 | Matsumoto | B43K 23/12 401/245 |
| 11,604,512 B1 | * | 3/2023 | Yu | G06F 3/014 |
| 2011/0244442 A1 | | 10/2011 | Sheeley et al. | |
| 2011/0310066 A1 | | 12/2011 | Fermgaard et al. | |
| 2013/0002553 A1 | * | 1/2013 | Colley | G06F 3/04886 345/161 |
| 2016/0027386 A1 | * | 1/2016 | Mizukami | H04W 52/0254 345/173 |

(Continued)

FOREIGN PATENT DOCUMENTS

CN 110816124 A 2/2020

OTHER PUBLICATIONS

LPMS-B2 Series Hardware Manual Ver. 1.0. (2020). LP-RESEARCH Inc., 12 p. https://lp-research.com/wp-content/uploads/2020/03/20200310LpmsB2HardwareManual.pdf (Year: 2020).*

(Continued)

*Primary Examiner* — Koosha Sharifi-Tafreshi
(74) *Attorney, Agent, or Firm* — ArentFox Schiff LLP

(57) ABSTRACT

Systems and methods are provided for a digital pen cap that can be positioned on the end of a stylus. The digital pen cap includes sensors for measuring position and orientation of the tip of the stylus, a controller configured to process the sensor data and output processed data, a memory for storing the processed data, and a transmitter for transmitting the processed data.

19 Claims, 11 Drawing Sheets

(56) References Cited

U.S. PATENT DOCUMENTS

2023/0288994 A1* 9/2023 Kokozidis ............ G06F 3/0383

OTHER PUBLICATIONS

M. Elleuch, H. Lahiani and M. Kherallah, "Recognizing Arabic Handwritten Script using Support Vector Machine classifier," 2015 15th International Conference on Intelligent Systems Design and Applications (ISDA), Marrakech, Morocco, 2015, pp. 551-556, doi:10.1109/ISDA.2015.7489176. (Year: 2015).*

Bu et al., "Handwriting-Assistant: Handwriting-Assistant: Reconstructing Continuous Strokes with Millimeter-level Accuracy via Attachable Inertial Sensors," Proceedings of the ACM on Interactive, Mobile, Wearable and Ubiquitous Technologies, Dec. 2021, vol. 5, No. 4, Article 146, pp. 1-25.

International Search Report and Written Opinion in PCT/EP2023/067812, mailed Oct. 2, 2023, 15 pages.

* cited by examiner

250

DIGITAL PEN CAP

CROSS REFERENCE TO RELATED APPLICATIONS

This application claims priority to U.S. Provisional Application No. 63/357,807 titled "DIGITAL PEN CAP," filed Jul. 1, 2022, which is assigned to the assignee hereof, and incorporated herein by reference in its entirety.

FIELD OF THE DISCLOSURE

The present invention relates to the field of electronic writing and drawing.

BACKGROUND

Electronic writing instruments allow a user to write on a surface in a traditional manner and have the writing digitally recorded or transferred to a computing device. Storing the writing digitally allows for a decrease in paper storage, and for easy computer organization of various writings. Electronic writing systems generally require a specialized writing surface and/or an image capture device to record the writings. In some systems, a pen with a digital camera captures pen strokes on a specialized dot paper as an image, and sends the image to a host for processing. Another system includes an infrared and ultrasound clip for attaching to the paper. Other technology for digitizing writing, such as Optical Character Recognition (OCR), uses offline processing for digitization of images.

Conventional electronic writing instruments may impose specific requirements on the writing implement, the writing surface, and/or the computing device. Such conventional electronic writing instruments may not operate if a corresponding component is missing or incompatible (e.g., from another manufacturer). Accordingly, there is a need to reduce the number of specialized hardware components in an electronic writing system.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a cap for positioning on a shaft to record movements of the shaft, including: a housing configured to be attached to a distal end of the shaft opposite a writing end of the shaft; a plurality of sensors configured to measure position and orientation of the distal end of the shaft and output the position and orientation as sensor data; a controller configured to process the sensor data and output processed data; a memory configured to store the processed data; and a transmitter configured to transmit the processed data.

In some aspects, the techniques described herein relate to a method of transcribing writing using a writing implement having a shaft with a writing end and a distal end opposite the writing end, including: receiving sensor data including a plurality of samples of a position and an orientation of a removable cap including a plurality of inertial sensors attached to the distal end of the shaft; extracting a feature set from the sensor data over a sampling window; and classifying the feature set into a character based on a trained classification model.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Figure 1A:
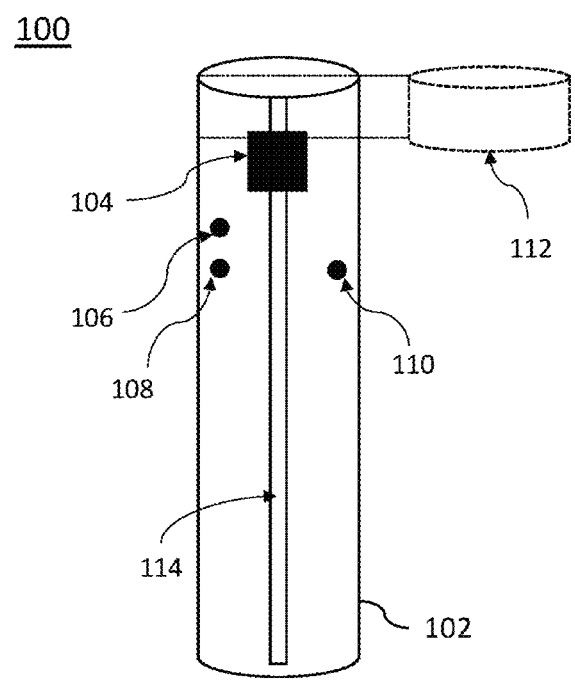
FIGS. 1A-1B show diagrams illustrating a digital pen cap, according to some aspects of the disclosure.

Systems and methods for a digital pen cap are disclosed. Conventional electronic writing instruments impose specific requirements on the writing implement, the writing surface, and/or the computing device. These requirements often require two or more devices to operate together. For example, some digital pens may only be used with a specific computing tablet that has a surface (e.g., including sensors) that interacts with a particular feature of the digital pen (e.g., transmitter). Such conventional electronic writing instruments may not operate if a corresponding component is missing or incompatible (e.g., from another manufacturer). Accordingly, there is a need to reduce the number of specialized hardware components in an electronic writing system.

In an aspect, a digital pen cap includes one or more inertial sensors for tracking a pattern of strokes with a shaft. The digital pen cap can be positioned on the end of a shaft such as a pen, pencil, or stylus, and the inertial sensor tracks movements of the shaft. The movements tracked by the inertial sensor in the pen cap are translated to track movements of the shaft on a writing surface. Movements of the pen cap may be classified based on submovements. The digital pen cap includes sensors, a processor, a transceiver, and a housing module.

The digital pen cap sits on shaft, which may be any pen, pencil, or stylus-like device. The pen cap includes inertial sensors that capture the movements and/or strokes performed by the user while writing or drawing. The pen cap is designed to identify patterns and/or strokes and digitize the writing and drawings. The pen cap can wirelessly transmit the identified patterns and/or strokes to another device, thereby digitizing writing or drawing performed using the shaft to which the pen cap is attached.

The digital pen cap may operate with conventional writing implements or digital pens. In the case of a conventional writing instrument, the digital pen cap may effectively create a digital copy of what was written on a paper. The digital pen cap does not require any particular writing surface, thereby reducing the compatibility issues of conventional digital writing. In some implementations, the digital pen cap may operate without any writing surface. Further, the digital pen cap may communicate with a computing device using an application programming interface (API) that does not require specialized hardware for the computing device, thereby reducing compatibility requirements between the digital pen cap and the computing device.

The digital pen cap system includes inertial subsystems, a processor subsystem, communication subsystems, and a memory subsystem. The inertial sensor in the pen cap sits at the end of the shaft of a pen, pencil, or stylus and tracks the movement. The digital pen cap system analyzes the sensor data to recognize the patterns and interprets the patterns as letters, characters, words, sentences, or drawings. The pen cap can also identify the distance of the tip of the pen, pencil, or stylus from the writing surface.

In some implementations, the inertial subsystem includes an adjustable mechanism such as a slide or screw for adjustable positioning and orientation of the inertial sensors. This adjustable mechanism allows a user to calibrate and use the digital pen cap irrespective of pen, pencil, or stylus size. Additionally, the adjustment functionality allows a user to adjust the position of the sensor for better movement detection.

In various implementations, the pen cap includes switches, a power button for changing between various modes, and a functionality setting, such as writing or drawing. The pen cap may include various indicators such as red-green-blue (RGB) light emitting diodes (LEDs) for indicating different modes, signal quality, or signal strength of the input data coming from the sensors. In some examples, a battery compartment is positioned inside the pen cap, and a user can replace the battery. In other examples, the battery may be rechargeable without replacement. The pen cap can be adjusted to be mounted on different sizes of pen, pencil, or stylus. In various implementations, the pen cap determines the distance from the pen cap to the tip of the writing/drawing tool. In some examples, the pen cap determines the distance to the tip of the writing/drawing tool based on sensor data and algorithms.

FIG. 1A shows a front view 100 of an example pen cap 102, according to various aspects of the disclosure. The pen cap 102 includes a sensor 104, a first LED 106, a second LED 108, a switch 110, a battery 112, and an elongated aperture 114. In various examples, the sensor 104 is an inertial sensor board and is configured to detect inertial movements of the pen cap 102. In some examples, the sensor 104 includes an accelerometer and a gyroscope. The accelerometer detects rate of change of velocity of the sensor 104 and changes in speed of the movement of the sensor 104. The gyroscope detects orientation of the sensor 104, changes in orientation of the sensor 104, and angular velocity of the sensor 104. In some examples, the gyroscope is a microchip-packaged MEMS gyroscope.

In various examples, the first LED 106 is a battery indication LED. In one example, the first LED 106 turns on when the battery has charge and it turns off when the battery is out of charge. In some examples, the first LED 106 blinks when the battery charge is low. In some examples, the first LED 106 is green when the battery has charge, and turns red when the battery is low on charge.

In various implementations, the second LED 108 is a mode indication LED. In one example, the mode indication LED 108 changes colors depending on the selected mode. Various modes include on, off, recording, recording and transmitting lines as drawn, and detecting characters in writing and transmitting characters. The modes may also indicate the use of different sensors.

In various examples, the switch 110 is a push button. The switch 110 can be used to switch the pen cap 102 on, switch the pen cap 102 off (if it is already on), and/or switch between various modes of operation of the pen cap 102. A user can push the switch 110 to select the mode or turn the pen cap 102 on and off.

In various examples, the battery 112 powers the pen cap 102. In the aspect shown in FIG. 1A, the battery 112 is round and sits at the top of the pen cap. In other implementations, the battery is an elongated battery and is positioned at a side of the pen cap 102. In some implementations, the battery 112 is a rechargeable battery, and the pen cap 102 can be recharged without removing or replacing the battery. In other implementations, the battery 112 is a disposable battery, and the battery compartment is accessible to a user. The user can remove the battery 112 from the pen cap 102, and replace the battery 112 with a new battery 112.

In various examples, the elongated aperture 114 extends approximately the length of the pen cap 102. The pen cap 102 includes a sliding mechanism attached to the sensor 104, and the sliding mechanism can be used to move the sensor 104 up and down the elongated aperture 114 in the pen cap 102. In this way, the position of the sensor 104 is adjustable along the length of the pen cap 102. In some examples, the orientation of the sensor 104 is also adjustable. In various implementations, the adjustability of the position of the sensor 104 allows a user to calibrate the sensor 104 and use the pen cap 102 with any selected pen, pencil, or stylus.

Figure 1B:
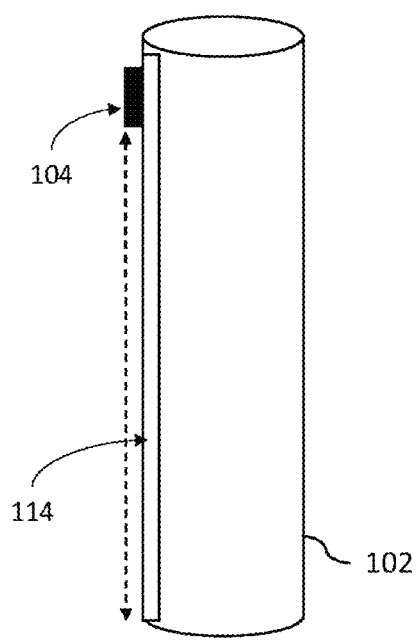

FIG. 1B shows a side view 120 of the pen cap 102, according to various aspects of the disclosure. FIG. 1B shows the sensor 104 and the elongated aperture 114. FIG. 1B includes an arrow showing the potential movement of the sensor 104 along the length of the pen cap 102 in the elongated aperture 114.

Figure 2A:
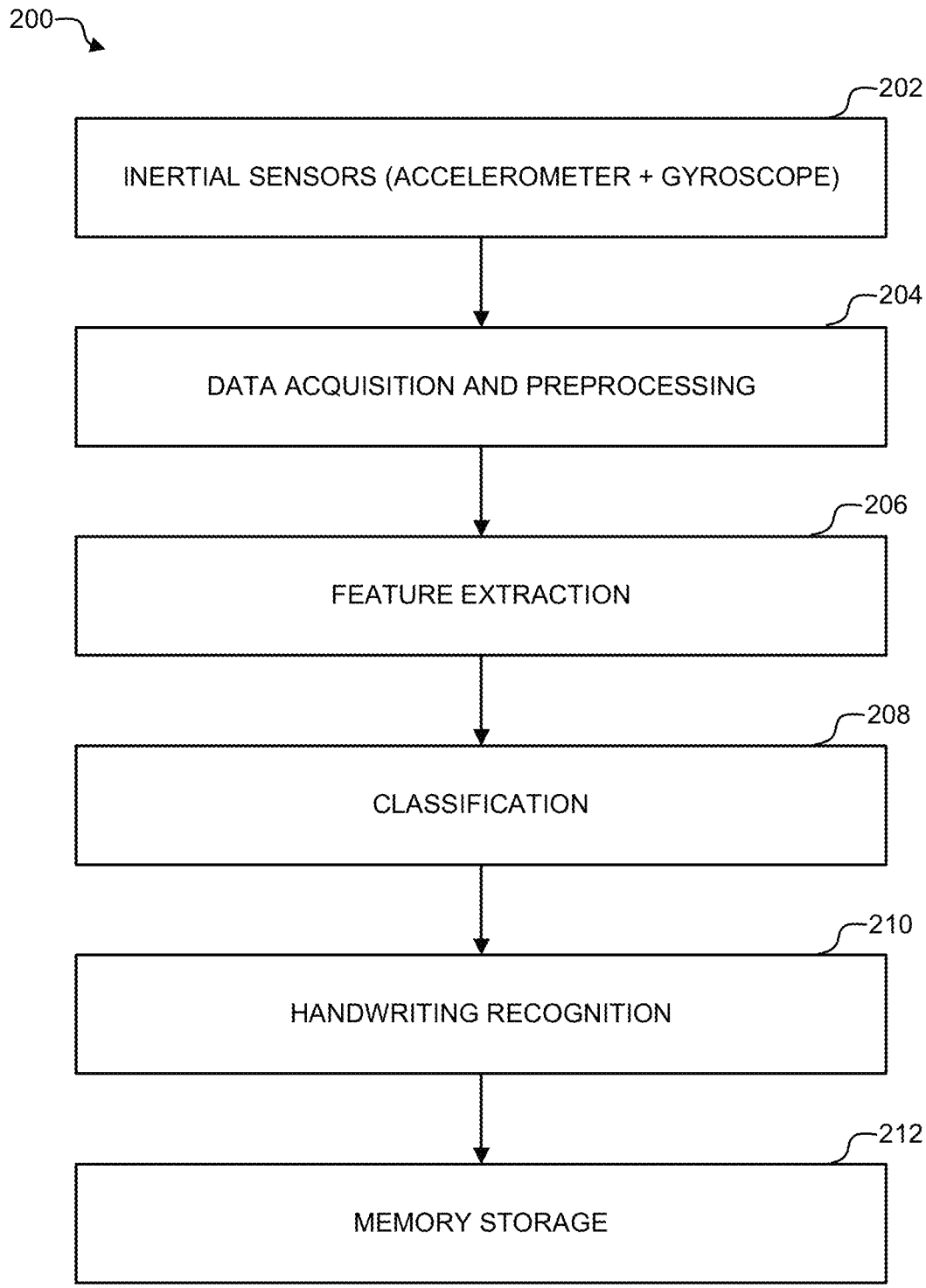
FIGS. 2A-2B show a block diagrams of functionality and data of a digital pen cap system, according to some aspects of the disclosure.

FIG. 2A shows a block diagram 200 of the functionality of pen cap 102. As shown in FIG. 2A, the pen cap 102 includes several sensors 202 which are used for feature extraction and handwriting recognition. The sensors 202 include inertial sensors such as one or more of an accelerometer and a gyroscope. The accelerometer measures both dynamic accelerations, resulting from motion, and static acceleration, such as tilt. These measurements are based on the position of a proof mass which is capacitively sensed and decoded to provide acceleration data. An accelerometer generally measures the rate of change of the velocity in meters per second squared ($m/s^2$) or in G-forces (g), where a single G-force is equivalent to 9.8 $m/s^2$ (though this can vary slightly with elevation). In some examples, the output of the accelerometer sensor from the pen cap described herein is in milli-g (mg). The gyroscope measures the angular velocity, tilt, and/or lateral orientation of the object along the Yaw, Pitch and Roll directions. The rotation rate of the sensor is converted into an electrical signal. The 16-bit analog-to-digital converter in the accelerometer and gyroscope samples the mechanical movements and reports the data digitally through serial communication at 1 kHz output data rate. The output data presents a binary value for each of the x, y, z, (Yaw, Pitch, and Roll) axes. The inertial sensors are designed to sense six degrees of freedom. In particular, the sensors 202 can sense movement forward and/or backward, up and/or down, left and/or right, along any of the three perpendicular axes (x-axis, y-axis, z-axis). Furthermore, the sensors 202 sense rotation or movement around any of the x-axis, the y-axis, and the z-axis. The sensors sense speed of movement of the pen cap in any direction, direction of movement of the pen cap, velocity of movement of the pen cap, and acceleration and/or deceleration of movement of the pen cap. The sensors also sense angular acceleration of the pen cap. According to various examples, the inertial sensors sense movement of the pen cap relative to a previous position.

In various implementations, sensor data can be used for machine learning. In particular, the pre-processed data is input to a machine learning module 320 (FIG. 3), which further processes the data. In various examples, the machine learning module is designed to digitally transcribe handwriting of the user. The machine learning module 320 performs machine learning to predict letters based on sensor data, including inertial sensor data, such as accelerometer and gyroscope data. In some examples, the machine learning module uses extracted features to predict letters. Machine learning can include (1) preprocessing (block 204)), (2) feature derivation/feature extraction (block 206), and (3) classification (block 208).

At block 204, sensor data from the inertial sensors 202 is acquired and pre-processed. The machine learning preprocessing step at block 204 includes band-pass filtering, for example, with a cutoff frequency of 20 Hz. For instance, data for all three axes is processed through a low-pass filter to remove incidental movement such as physiological tremors. In some implementations, the cutoff frequency may be adapted to a particular user based on the writing style of the particular user. For instance, the cutoff frequency may range from 3 Hz to 30 Hz. The filtered measurements for each sensor at the sampling rate may be recorded into a data structure. In some implementations, the measurements may be stored as a change in each of the six degrees of freedom (e.g., x, y, z, yaw, pitch, and roll). The pre-processed data can be saved in a memory 306 (FIG. 3) or transferred to another device (e.g., computing device 350 (FIG. 3)). In some examples, data is transferred using Bluetooth. The filtered data is then used for further processing (either at the pen cap 102 or the other device), including feature derivation/feature extraction at block 206 and classification at block 208.

In some implementations, the preprocessing in block 204 includes an initial step is boresighting of the sensors. In general, boresighting is a calibration procedure that includes determining the differences in the rotations of the sensors. For instance, boresighting may adjust for differences in alignment of the pen cap on different shafts. In various examples, rotational axes of an accelerometer, a gyroscope, and/or another inertial measurement unit can be determined. In some implementations, where the pen cap includes a camera, the rotational axis of the camera may be determined. In some examples, the boresighting step includes mean removal from the data for each measurement to center the measurements on zero. In an accelerometer, while deriving features, trends can be identified and used to determine noise. Additionally, in some examples, a piecewise linear model can be fit, and trends can be removed by dividing data into smaller segments. The preprocessed data may be stored in the memory 306 or transmitted to the other device. In some implementations, the preprocessed data may be transmitted to a cloud network for storage and/or processing.

The machine learning module 320 performs feature extraction at block 206. According to various implementations, the feature extraction step at block 206 includes determining mean, median, kurtosis, skewness, signal power, and Interquartile Range (IQR) statistical features for the three axes of the accelerometer. The kurtosis refers to a measure of the "tailedness" of the probability distribution of the measurements. The skewness refers to a measure of the asymmetry of the probability distribution of the measurements about the mean. The signal power refers to the sum of the absolute squares of the time-domain samples divided by the signal length, or, equivalently, the square of the RMS level. The derived features create a feature space which is used as input to a classification model at the classification block 208. In various examples, in real time, the feature extraction in block 206 derives a statistical feature set for a sample window, which may be, for example, 200 samples. In some implementations, the sample window of 200 samples may be a default value. The size of the sample window may be adapted to a particular user, for example, based on a writing speed of the user during a calibration process. For instance, the writing speed may be measured while the user writes a prescribed set of words or sentences. In some implementations, the size of the sample window may vary between 100 and 400 samples for a 1 kHz sampling rate.

As described above, data from the inertial sensors 202 is input to a feature extraction module 324 (FIG. 3) at block 206. The feature extraction module 324 at block 206 detects selected patterns in the input data and identifies the patterns as correlating with selected features. In various implementations, the feature extraction module 324 at block 206 uses a sample window of measured data to detect features. The sample window of measured data is updated over time. In general, feature extraction is used to reduce the total amount of data, such that the amount of data output from the feature extraction module is smaller than the amount of data input to the feature extraction module. For instance, the number of features for a sample window is smaller than the raw data of the samples for the sample window. The data output from the feature extraction module 324 is input to the classification model 326 at block 208. In some implementations, the classification model 326 may be located in an external device (e.g., a computing device 350 (FIG. 3)). Transmitting the feature set may be more efficient than transmitting raw or pre-processed samples.

Figure 2B:
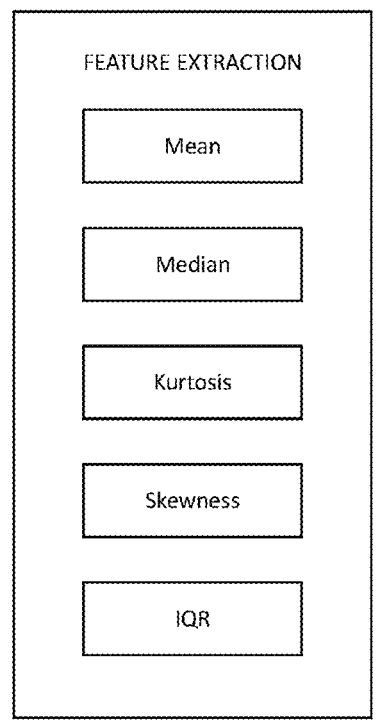

FIG. 2B is a diagram illustrating feature extraction values, according to various aspects of the disclosure. As shown in FIG. 2B, specific feature values include, for example, mean, median, kurtosis, skewness, signal power, and IQR (inter quartile range). In some implementations, feature extraction is used for sub-movement analysis and identification of hand movements. Features such as Kurtosis provide a measurement of randomness by, for example, yielding lower values for noise (−1.2) and higher values for specific data.

Returning to FIG. 2A, in block 208, a classification model 326 predicts the character for a feature set. In some implementations, a support vector machine (SVM) is used as a classification model 326 to classify the derived features into a character. Other example, classification models may include neural networks, decision trees, bagging classifiers, or random forests. In some implementations, multiple classification models may be combined, for example, using gradient boosting.

In various examples, the classification model 326 at block 208 can be trained using training data acquired for a set of characters from subjects using the pen cap. For example, the set of characters may correspond to letters in an alphabet. Separate classification models may be used for different alphabets or languages. The subjects may generate training data by writing prescribed words and sentences. Individual characters may be separated in the training data by noise or movement patterns (e.g., spaces between characters). The feature space for each character can be labeled with class labels corresponding to the characters of the prescribed words and sentences. The training data may be divided in to 70%-30% for training and testing purposes. In some examples, among various classification models, a support vector machine (SVM) yields best accuracy. Thus, in various examples, the SVM is used as machine learning model for the classification task.

In some implementations, block 206 includes submovement analysis. Submovement analysis finds gaussian curves and breaks down the curve into small submovements. The submovements are provided as features to the classification model. In some implementations, the classifier engine at block 208 has two steps. The first step is primary classification based on submovements. The second step is a secondary classification that further classifies the submovements into characters based on specific feature values.

Figure 3:
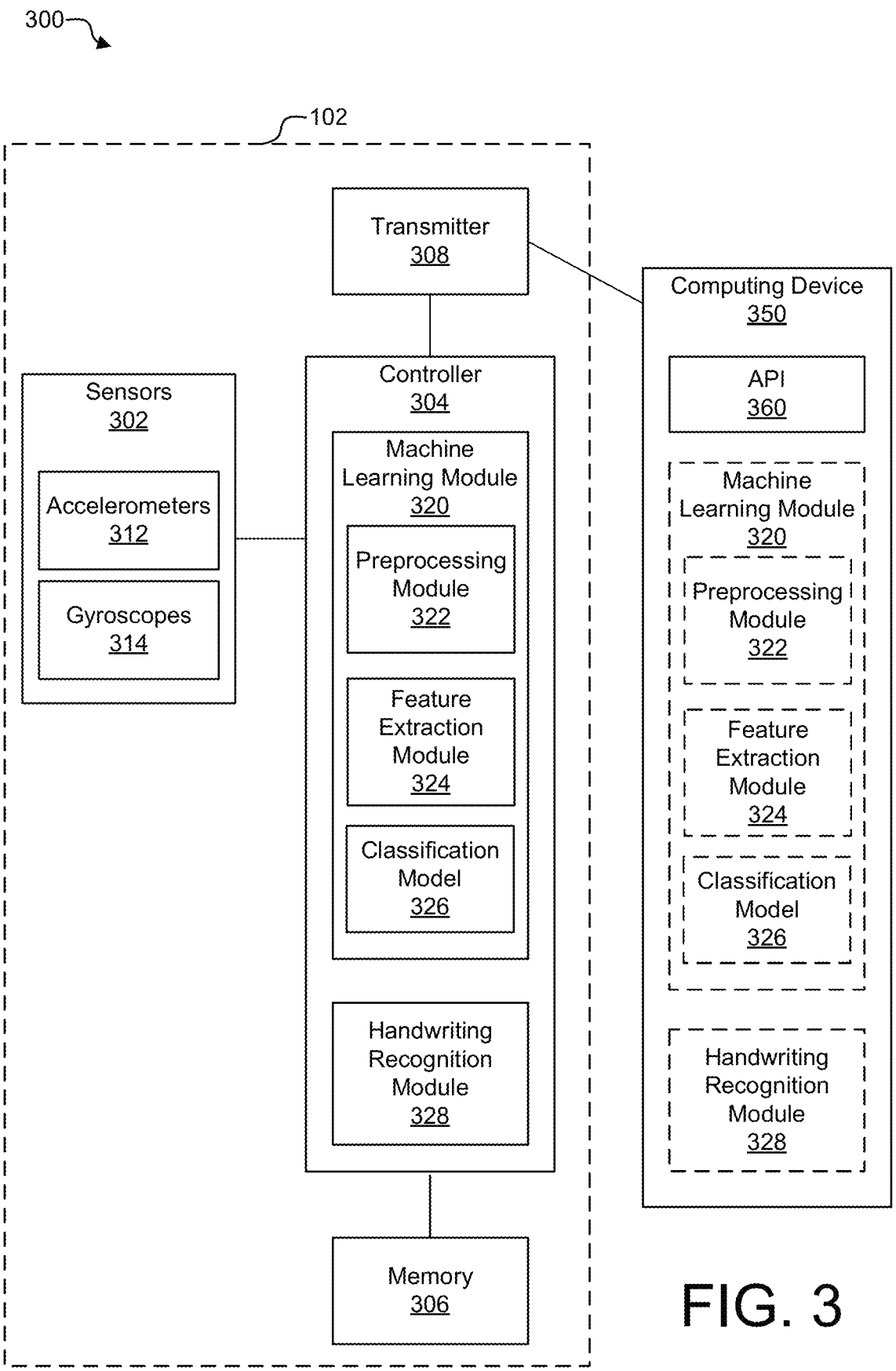
FIG. 3 shows another block diagram of a digital pen cap system, according to some aspects of the disclosure.

At block 210, the data from the classification model 336 is input to a handwriting recognition module 328 (FIG. 3). The handwriting recognition module can be used to interpret hand-written data. In some implementations, the handwriting recognition module 328 may include predictive selection of words based on a dictionary. For instance, the handwriting recognition module may predict options for completion of a word based on initial characters of the word. The predicted options may be used to reduce the feature space for the character recognition of the subsequent characters in block 206. Additionally or alternatively, the handwriting recognition module may verify or correct a word output by the classification model.

In some implementations, the handwriting recognition module 328 outputs the handwriting recognition data to memory storage at block 210. In some examples, the memory storage is integrated into the digital pen cap. In other examples, the memory storage is separate from the digital pen cap and the handwriting recognition data is transferred to an externally located memory storage. In some examples, a Bluetooth connection is used to transfer data from the digital pen cap to an external storage. In some examples, the Bluetooth connection is a Bluetooth low energy (BLE) connection, a low power wireless communication technology.

FIG. 3 is another block diagram 300 showing elements of a digital pen cap 102, according to various implementations of the disclosure. The digital pen cap 102 includes sensors 302, a controller 304, a memory 306, and a transmitter 308. The sensors 302 include inertial sensors, such as an accelerometer 312 and a gyroscope 314, and sense movements of the digital pen cap. The sensors 302 transmit data to the controller 304, for example, via a wired bus. In some implementations, the controller 304 processes the received data. In some examples, the controller 304 outputs the data to a memory 306 where the data is stored. In some examples, the controller 304 outputs the data to a transmitter 308. The transmitter 308 transmits the data, for example, to a computing device 350. In various examples, the transmitter 308 is a Bluetooth transmitter.

In an aspect, the controller 304 includes the machine-learning module 320 and the handwriting recognition module 328. As discussed above, the machine learning module 320 may include a preprocessing module 322 for performing block 204, a feature extraction module 324 for performing block 206, and a classification model 326 for performing block 208. In some implementations, the preprocessing module 322 may include a low pass filter. The feature extraction module 324 may include a circuit and/or software executed by one or more processors for calculating each of the features discussed above with respect to FIG. 2B. The classification model 326 may be a machine-learning model such as a SVM trained to classify the features into a character. In some implementations, the machine-learning module 320 may include multiple classification models 326, each trained for a specific alphabet or language. In some implementations, the classification model(s) 326 are pre-trained, for example, based on writing samples from multiple subjects. In some implementations, the classification model 326 may be trained or tuned based on a training set generated by a user based on a prescribed text (e.g., a set of words or sentences written by the user with the pen cap 102 attached to a shaft). Training or tuning the classification model 326 for a user may improve accuracy of character classification for the particular user. For example, a SVM may be tuned by changing configurable parameters whereas a neural network may have adjustable weights that are adjusted via additional training.

The transmitter 308 transmits data to a computing device 350. The transmitter 308 may transmit any data stored in memory 306. In some implementations, the computing device 350 includes an application having an API 360. The application is configured to receive the data from the pen cap 102. In some implementations, the API 360 is configured to receive processed data such as characters or words from the pen cap 310. In some implementations, the computing device 350 or application thereon may include one or more of the machine learning module 320 or the handwriting recognition module 328. The API 360 may receive raw or partially processed data from the pen cap 102 and perform further processing. For example, the API 360 may receive raw data (e.g., measurements from sensors 302), pre-processed data (e.g., output from preprocessing module 322), features (e.g., output from feature extraction module 324), characters (e.g., output from classification model 326), or words (e.g., output from handwriting recognition module 328). The computing device 350 may execute the machine learning module 320 and/or handwriting recognition module 328 to perform further processing, for example, as described above with respect to FIG. 2A.

According to various implementations, a processor (e.g., controller 304 or a processor of computing device 350) collects data from the inertial sensors 302, including an accelerometer 312 and a gyroscope 314, and uses the data to derive pen cap position, velocity, and orientation information. In one example, the processor is a microprocessor. In some examples, the processor is part of a controller (and/or microcontroller). In some implementations, the processor filters the data with a second order low-pass filter. In one example, the second order low pass filter has a cut-off frequency of 4 Hz and thereby filters out physiological tremors. In some examples, data is further filtered using data windowing for selecting hand movement. In some implementations, when the pen-cap is in use, in real time, continuous data is passed to a microcontroller and, for every 200 samples, the statistical features are computed in the feature extraction module 324. The extracted features are passed to machine learning models (e.g., classification model 326) which classify letters based on extracted feature values.

In some examples, the processor collects raw data from the sensors and stores the raw data locally in a flash memory (e.g., memory 306). In some examples, the flash memory in the pen cap has a storage capacity of one of about 256 MB, 512 MB, 1024 MB, or larger. In some implementations, data from the flash memory is wirelessly transmitted to an external computing device 350. In various examples, data can be transmitted using one of a Bluetooth connection, a USB connection, or a USB C communication.

In some implementations, data is transmitted to an application program interface (API) 360 in an encrypted format. In one example, the encrypted format is a JavaScript object notation (JSON) object. The API 360 includes an algorithm to accept encrypted data and decrypt and decode the encrypted data.

In some implementations, the digital pen cap 102 includes a rechargeable power source, and can be charged using one of a USB type C charger and a wireless charging option. In one examples, the wireless charging option is a magnetic charger. In some implementations, the digital pen cap includes a removable battery that can be replaced by a user.

Figure 4A:
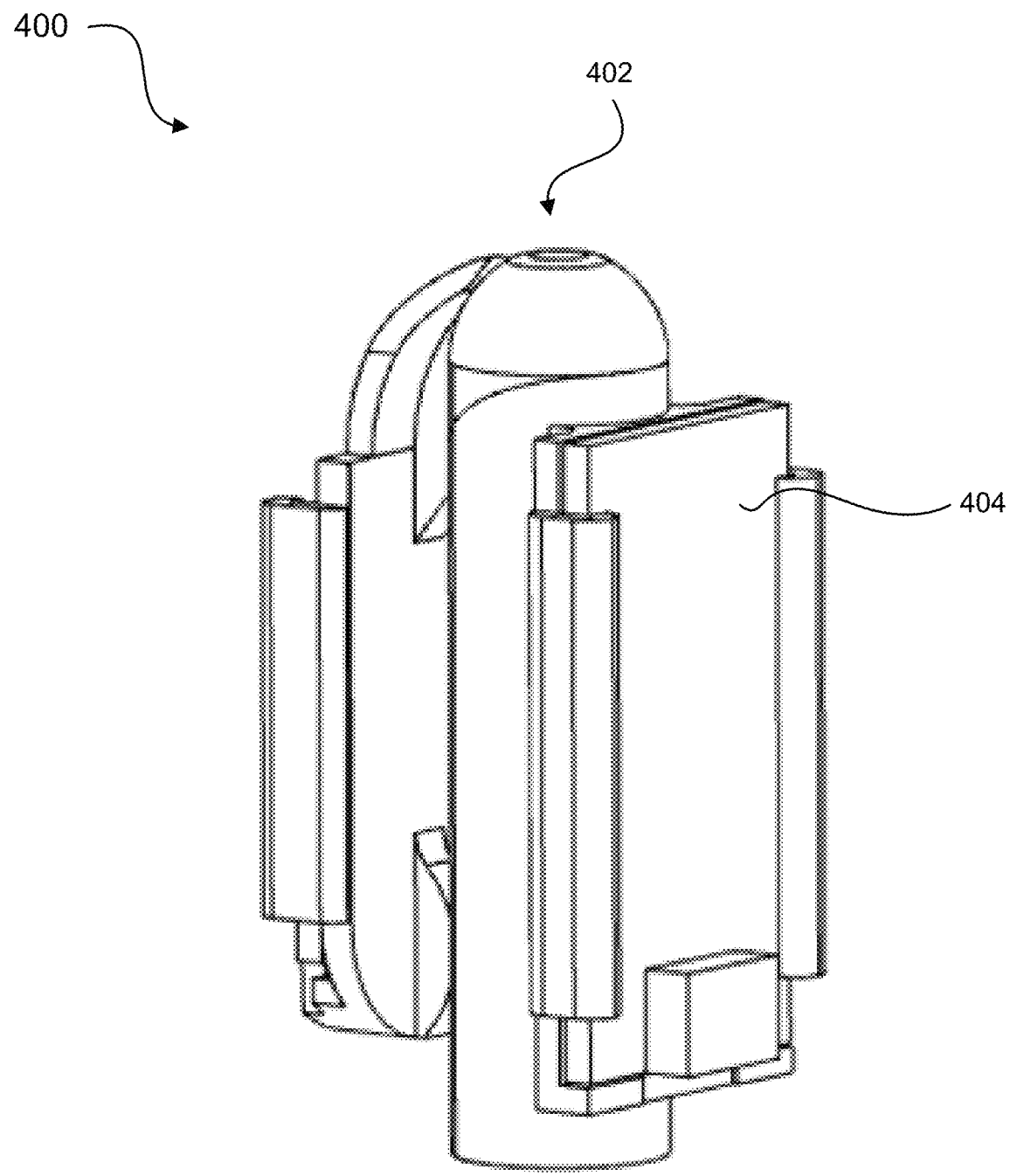
FIGS. 4A-4D show diagrams illustrating views of a digital pen cap, according to some aspects of the disclosure.
Figure 4B:
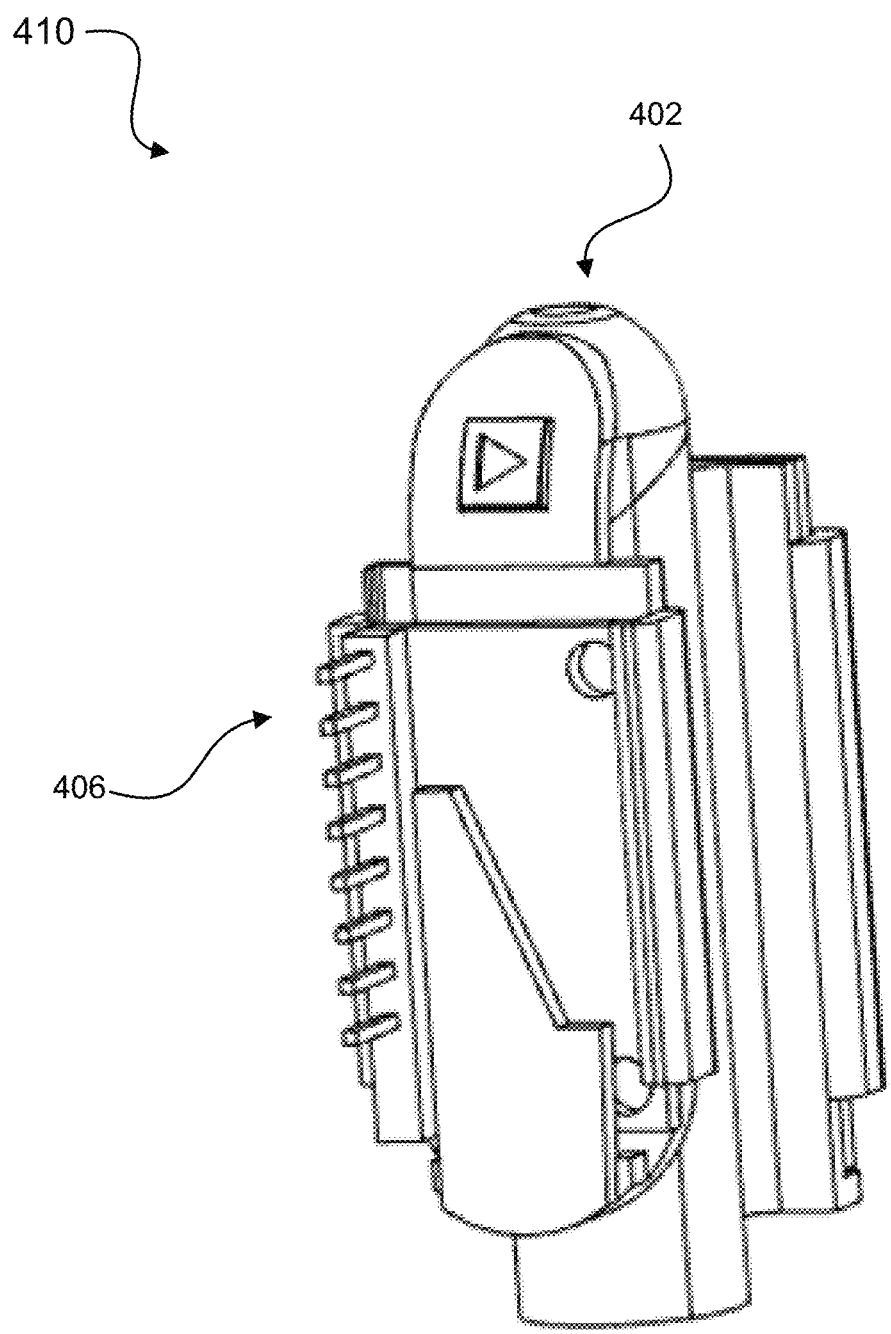
Figure 4C:
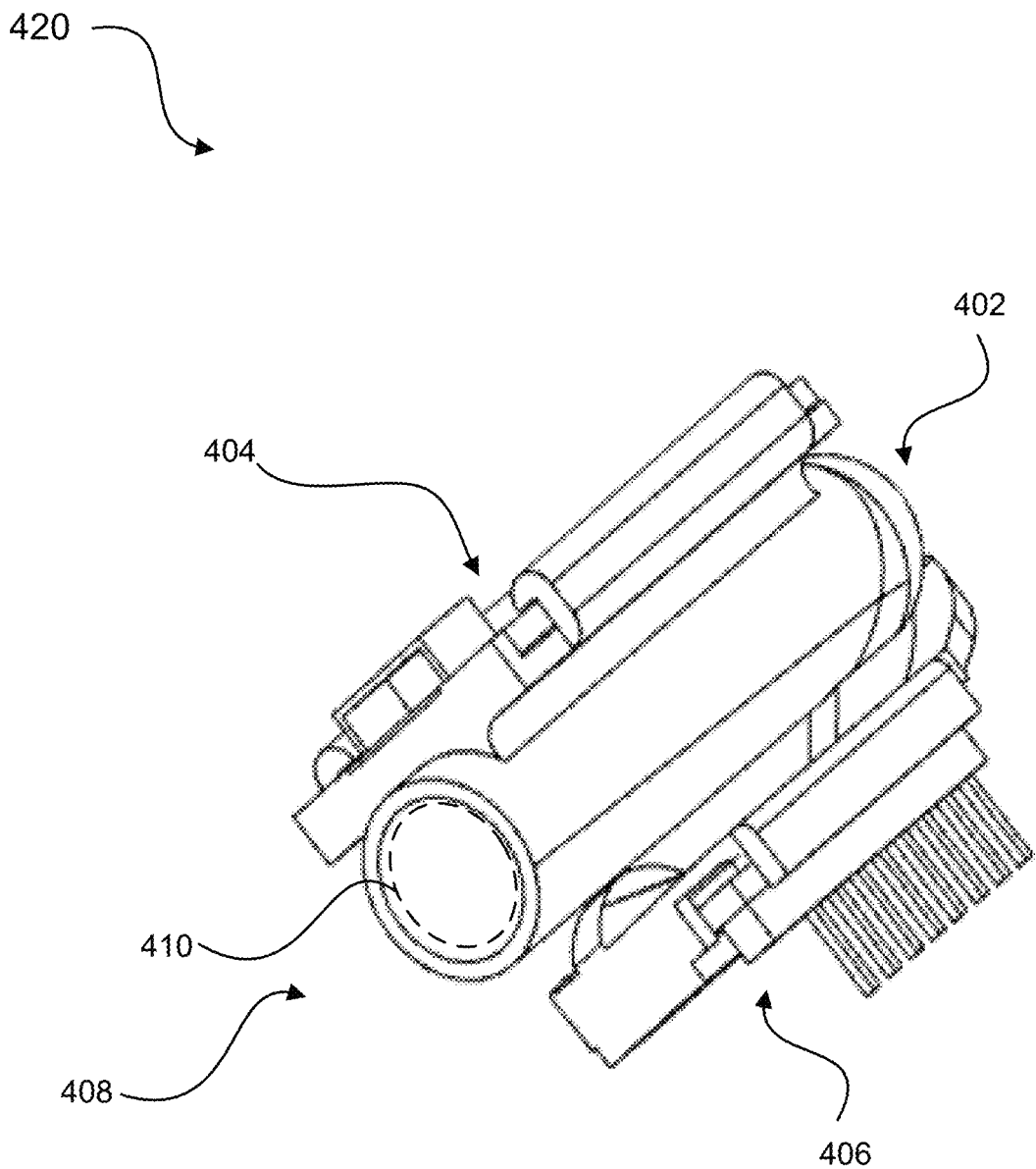
Figure 4D:
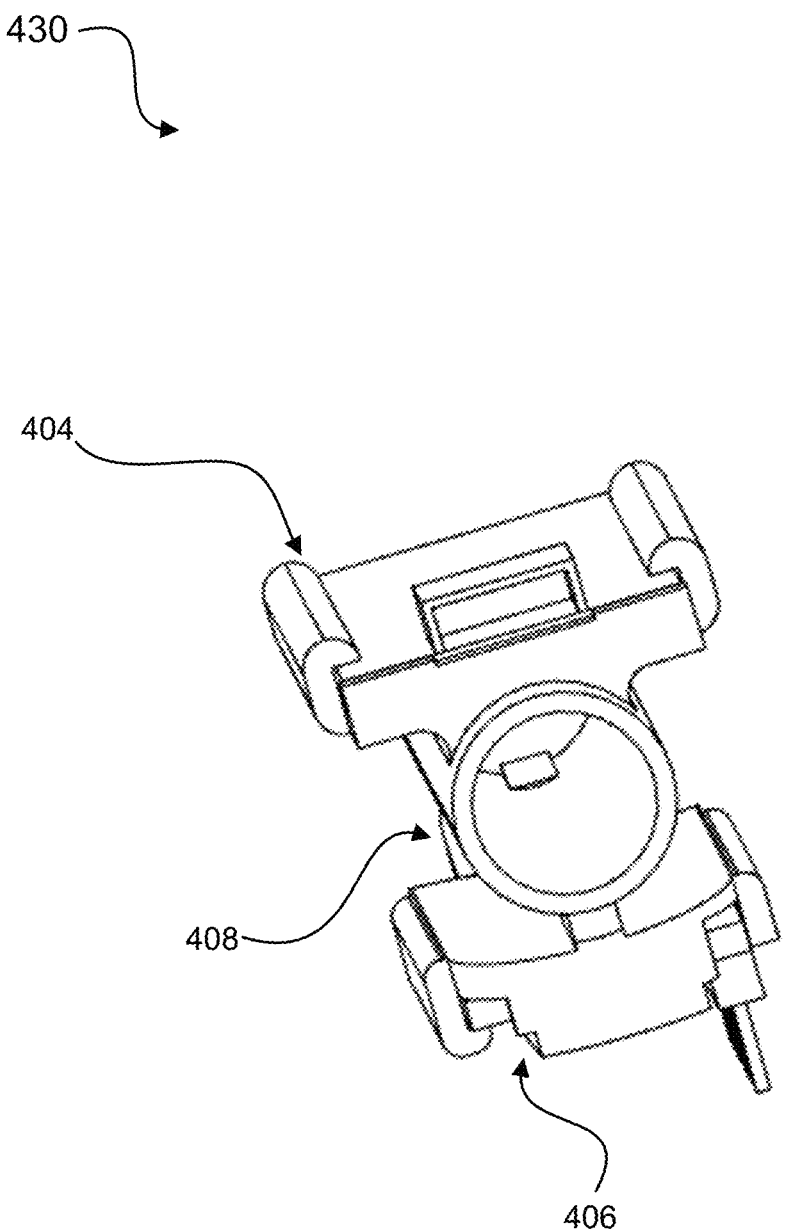

FIGS. 4A-4C show side views of a digital pen cap, according to various aspects of the disclosure. FIG. 4D shows a bottom view of a digital pen cap, according to various aspects of the disclosure. FIG. 4A shows a first side view 400 of a digital pen cap 402. The first side view 400 shows a sensor board 404 attached to the pen cap 402. According to various examples, the sensor board 404 can be moved vertically to with respect to the pen cap 402, as described with respect to FIG. 1A. The sensor board 404 extends most of the length of the pen cap 402. In various implementations, the sensor board 404 can be any selected size to contain the sensors to detect the movements of the pen cap 402.

FIG. 4B shows a second side view 410 of the digital pen cap 402. The second side view 410 shows the opposite side of the pen cap 402 from the first side view 400. The second side view 410 shows the clip side of the pen cap. A circuit board 406 is included in the clip side of the sensor board. According to some implementations, the circuit board in the clip side of the digital cap includes a transmitter for transmitting signals from the sensor cap 402. In some examples, the transmitter wirelessly transmits signals to an external device (e.g., computing device 350). In some examples, the transmitter transmits signals via a Bluetooth connection. In some implementations, the circuit board 406 may include multiple protruding elements, which may provide connectivity (e.g., for a wired connection).

FIG. 4C shows another side view 420 of the pen cap 402 including both the sensor board 404 side of the pen cap and the clip side of the pen cap including the circuit board 406. The side view 420 shows the barrel 408 of the pen cap 402. According to various examples, the barrel of the pen cap 402 can be adjusted to accommodate any size stylus. In one example, the diameter of the barrel 408 of the pen cap 402 can be reduced by inserting a second tube (e.g., a rubber sleeve 410) within the barrel 408 to effectively narrow the diameter of the barrel 408.

FIG. 4D shows a bottom view of the pen cap 402 including the sensor board 404, the circuit board 406, and the barrel 408.

Figure 5:
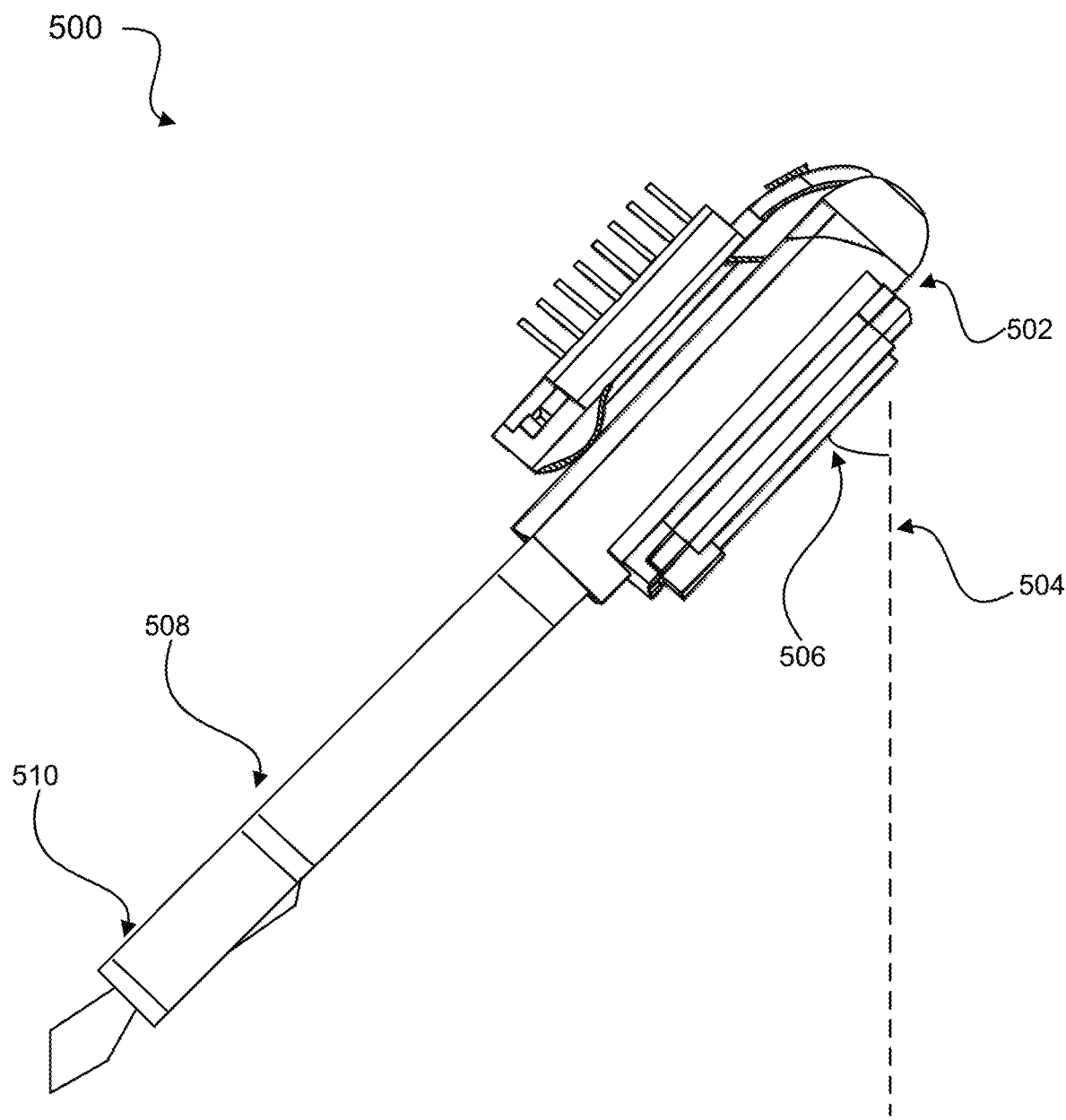
FIG. 5 shows a digital pen cap positioned on the end of a stylus, according to some aspects of the disclosure.

FIG. 5 shows a digital pen cap 502 positioned on a distal end of a stylus 508, according to various implementations of the disclosure. As described above, the digital pen cap 502 includes sensors. The sensors in the digital pen cap 502 determine the distance 504 between the pen cap and the writing surface. Additionally, sensors in the pen cap 502 determine the angle 506 between the pen cap 502 and the distance line. Using the angle 506 and the distance 504, the digital pen cap 502 determines the position of the tip 510 (i.e., a writing end) of the stylus 508. As described above, the digital pen cap 502 measures and records movements of the digital pen cap 502 along any given axis, and uses the recorded movements to determine movements of the tip 510 of the stylus 508.

Figure 6:
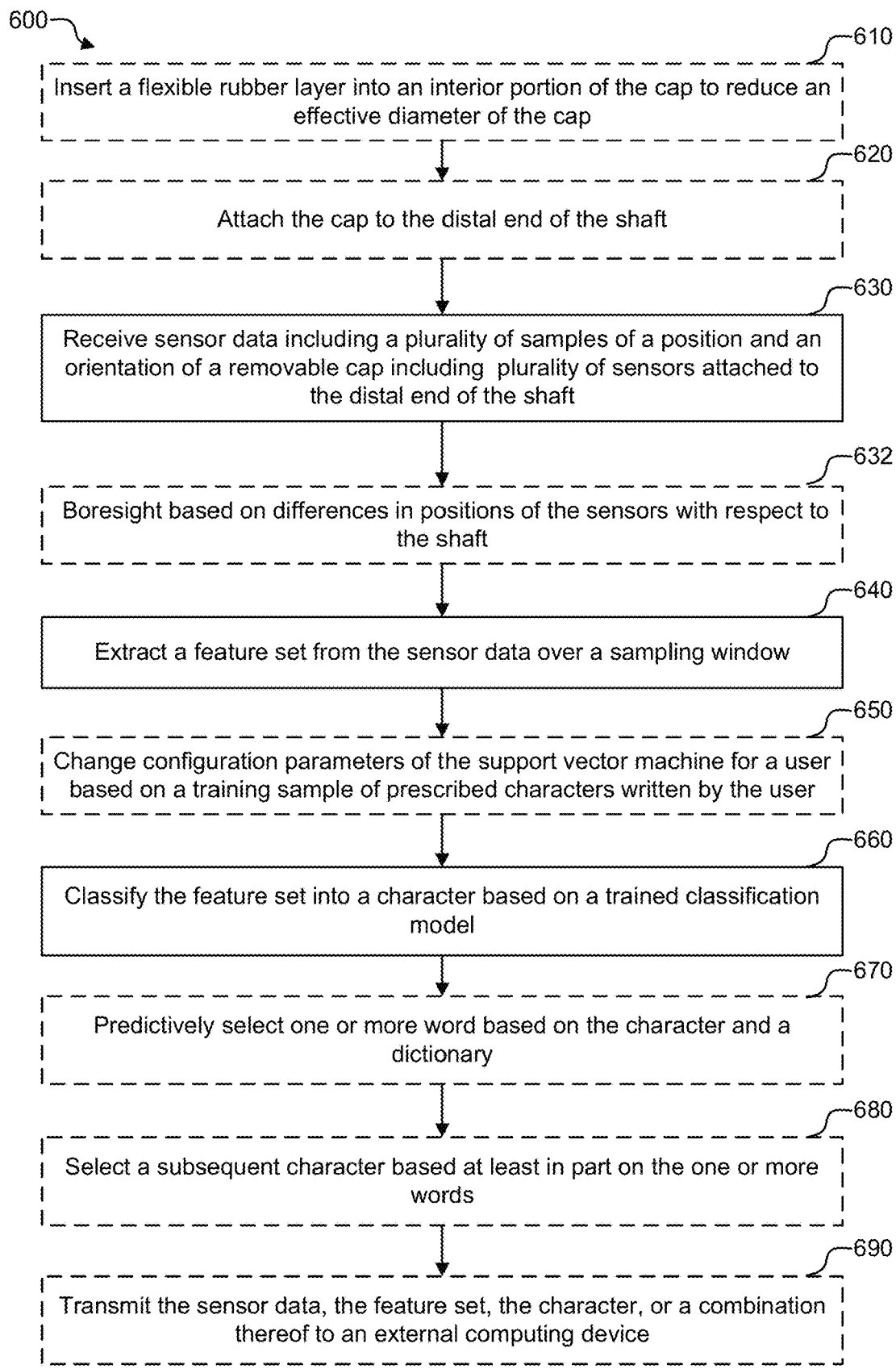
FIG. 6 is a flowchart of an example method of transcribing writing using a writing implement having a shaft with a writing end and a distal end opposite the writing end.

FIG. 6 is a flowchart of an example method 600 of transcribing writing using a writing implement having a shaft with a writing end and a distal end opposite the writing end. The method 600 may be performed by the pen cap 102 or optionally by a user or a computing device 350 in communication with the pen cap. For example, in some implementations, the method 600 may also include configuration of the pen cap 102.

In block 610, the method 600 may optionally include inserting a flexible rubber layer into an interior portion of the cap to reduce an effective diameter of the cap. For example, a user may insert a flexible rubber layer into an interior portion of the cap 102 to reduce an effective diameter of the cap.

In block 620, the method 600 may optionally include attaching the cap to the distal end of the shaft. For example, the user may attach the pen cap 102 to the distal end of the stylus 508.

In block 630, the method 600 includes receiving sensor data including a plurality of samples of a position and an orientation of a removable cap including a plurality of inertial sensors attached to the distal end of the shaft. For example, in some implementations, the controller 304 receives sensor data including a plurality of samples of a position and an orientation of a removable cap including a plurality of inertial sensors 302 attached to the distal end of the shaft. For example, the controller 304 may receive the samples from the sensors 302 via a wired bus. In other implementations, the computing device 350 may receive the samples via the transmitter 308.

In some implementations, at block 642 may optionally include boresighting based on differences in positions of the sensors with respect to the shaft. For example, the preprocessing module 322 may perform the boresighting of the multiple sensors. In some implementations, the preprocessing module 322 may apply a low pass filter to the plurality of samples.

In block 640, the method 600 includes extracting a feature set from the sensor data over a sampling window. For example, the controller 304 and/or the computing device 350 may execute the feature extraction module 324 to extract the feature set from the sensor data over the sampling window.

In block 650, the method 600 may optionally include changing configurable parameters of the support vector machine for a user based on a training sample of prescribed characters written by the user. For example, the controller 304 and/or the computing device 350 may change the configurable parameters of the support vector machine (i.e., classification model 326) for a user based on a training sample of prescribed characters written by the user.

In block 660, the method 600 includes classifying the feature set into a character based on a trained classification model. For example, the controller 304 and/or the computing device 350 may execute the classification model 326 to classify the feature set into a character.

In block 670, the method 600 may optionally include predictively selecting one or more word based on the character and a dictionary. For example, the controller 304 and/or the computing device 350 may execute the handwriting recognition module 328 to predictively select one or more words based on the character and a dictionary. The selection may also be based on a contextual embedding of one or more characters.

In block 680, the method 600 may optionally include selecting a subsequent character based at least in part on the one or more words. For example, the controller 304 and/or the computing device 350 may execute the handwriting recognition module 328 to select a subsequent character based at least in part on the one or more words. For instance, the handwriting recognition module 328 may select the subsequent character that has the highest likelihood predicted by the classification model 326 that is next in one of the selected words.

In block 690, the method 600 may optionally include transmitting the sensor data, the feature set, the character, or a combination thereof to an external computing device. For example, the transmitter 308 may transmit the sensor data, the feature set, the character, or a combination thereof to the external computing device 350. The block 690 may optionally be performed, for example, before any of blocks 630, 640, 660, or 670 depending on the data to be transmitted.

The following numbered clauses provide an overview of aspects of the present disclosure:

Clause 1. A cap for positioning on a shaft to record movements of the shaft, comprising: a housing configured to be attached to a distal end of the shaft opposite a writing end of the shaft; a plurality of sensors configured to measure position and orientation of the distal end of the shaft and output the position and orientation as sensor data; a controller configured to process the sensor data and output processed data; a memory configured to store the processed data; and a transmitter configured to transmit the processed data.

Clause 2. The cap of clause 1, wherein to process the sensor data the controller is configured to perform feature extraction on the sensor data, and wherein the processed data includes extracted features.

Clause 3. The cap of clause 2, wherein feature extraction includes boresighting based on differences in positions of the sensors with respect to the shaft.

Clause 4. The cap of clause 2 or 3, wherein the extracted features include two or more of: mean, median, kurtosis, skewness, signal power, and inter quartile range.

Clause 5. The cap of any of clauses 1-4, further comprising a machine learning module configured to: receive the processed data; extract features from the processed data; and classify the features into a character based on a trained classification model.

Clause 6. The cap of clause 5, wherein the trained classification model is a support vector machine.

Clause 7. The cap of clause 6, wherein the controller is configured to change configurable parameters of the support vector machine for a user based on a training sample of prescribed characters written by the user.

Clause 8. The cap of any of clauses 1-7, wherein the plurality of sensors includes at least one gyroscope and at least one accelerometer.

Clause 9. The cap of any of clauses 1-8, further comprising a flexible rubber layer removably connected to an interior portion of the housing to reduce an effective diameter of the housing.

Clause 10. The cap of any of clauses 1-9, further comprising a battery configured to provide power to the plurality of sensors, the controller, the memory, and the transmitter.

Clause 11. The cap of any of clauses 1-10, wherein the transmitter is configured to transmit a short-range wireless signal.

Clause 12. A method of transcribing writing using a writing implement having a shaft with a writing end and a distal end opposite the writing end, comprising: receiving sensor data including a plurality of samples of a position and an orientation of a removable cap including a plurality of inertial sensors attached to the distal end of the shaft; extracting a feature set from the sensor data over a sampling window; and classifying the feature set into a character based on a trained classification model.

Clause 13. The method of clause 12, wherein extracting the feature set comprises boresighting based on differences in positions of the sensors with respect to the shaft.

Clause 14. The method of clause 12 or 13, wherein the extracted features include two or more of: mean, median, kurtosis, skewness, signal power, and inter quartile range.

Clause 15. The method of any of clauses 12-14, wherein the trained classification model is a support vector machine.

Clause 16. The method of clause 15, further comprising changing configurable parameters of the support vector machine for a user based on a training sample of prescribed characters written by the user.

Clause 17. The method of any of clauses 12-16, wherein the plurality of sensors includes at least one gyroscope and at least one accelerometer.

Clause 18. The method of any of clauses 12-17, further comprising: inserting a flexible rubber layer into an interior portion of the cap to reduce an effective diameter of the cap; and attaching the cap to the distal end of the shaft.

Clause 19. The method of any of clauses 12-18, further comprising: predictively selecting one or more words based on the character and a dictionary; and selecting a subsequent character based at least in part on the one or more words.

Clause 20. The method of any of clauses 12-19, further comprising transmitting the sensor data, the feature set, the character, or a combination thereof to an external computing device.

In the discussions of the aspects above, the sensors, amplifiers, switches, transistors, memory, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

In one example aspect, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself.

In various aspects, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example aspect, the electrical circuits of the FIGURES may be implemented as stand-alone modules (e.g., a device with associated components and circuitry configured to perform a specific application or function) or implemented as plug-in modules into application specific hardware of electronic devices. Note that particular aspects of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other aspects may include a multi-chip-module (MCM), with a plurality of separate ICs located within a single electronic package and configured to interact closely with each other through the electronic package. In various other aspects, the clocking and filtering functionalities may be implemented in one or more silicon cores in Application Specific Integrated Circuits (ASICs), Field Programmable Gate Arrays (FPGAs), and other semiconductor chips.

All of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example aspects have been described with reference to particular processor and/or component arrangements. Various modifications and changes may be made to such aspects without departing from the scope of the appended claims. The description and drawings are, accordingly, to be regarded in an illustrative rather than in a restrictive sense.

Note that the activities discussed above with reference to the FIGURES are applicable to any integrated circuits that involve signal processing, particularly those that use sampled analog, some of which may be associated with processing real-time data. Certain aspects can relate to multi-DSP signal processing, floating point processing, signal/control processing, fixed-function processing, microcontroller applications, etc.

In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one aspect", "example aspect", "an aspect", "another aspect", "some aspects", "various aspects", "other aspects", "alternative aspect", and the like are intended to mean that any such features are included in one or more aspects of the present disclosure, but may or may not necessarily be combined in the same aspects.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. § 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

The invention claimed is:

1. A cap for positioning on a shaft to record movements of the shaft, comprising:
    a housing configured to be attached to a distal end of the shaft opposite a writing end of the shaft;
    a plurality of sensors configured to measure position and orientation of the distal end of the shaft and output the position and orientation as sensor data;
    a controller configured to process the sensor data and output processed data;
    a memory configured to store the processed data;
    a transmitter configured to transmit the processed data; and
    a machine learning module configured to:
        receive the processed data;
        extract features from the processed data; and
        classify the features into a character based on a trained classification model,
        wherein to classify the features into a character, the machine learning module is configured to:
            perform primary classification based on submovement analysis that finds Gaussian curves and breaks each curve into submovements; and
            perform secondary classification that classifies the submovements into characters based on specific values of the extracted features.

2. The cap of claim 1, wherein to process the sensor data the controller is configured to perform feature extraction on the sensor data, and wherein the processed data includes extracted features.

3. The cap of claim 2, wherein feature extraction includes boresighting based on differences in positions of the sensors with respect to the shaft.

4. The cap of claim 2, wherein the extracted features include two or more of: mean, median, kurtosis, skewness, signal power, and inter quartile range.

5. The cap of claim 1, wherein the trained classification model is a support vector machine.

6. The cap of claim 5, wherein the controller is configured to change configurable parameters of the support vector machine for a user based on a training sample of prescribed characters written by the user.

7. The cap of claim 1, wherein the plurality of sensors includes at least one gyroscope and at least one accelerometer.

8. The cap of claim 1, further comprising a flexible rubber layer removably connected to an interior portion of the housing to reduce an effective diameter of the housing.

9. The cap of claim 1, further comprising a battery configured to provide power to the plurality of sensors, the controller, the memory, and the transmitter.

10. The cap of claim 1, wherein the transmitter is configured to transmit a short-range wireless signal.

11. A method of transcribing writing using a writing implement having a shaft with a writing end and a distal end opposite the writing end, comprising:
receiving sensor data including a plurality of samples of a position and an orientation of a removable cap including a plurality of inertial sensors attached to the distal end of the shaft;
extracting a feature set from the sensor data over a sampling window; and
classifying the feature set into a character based on a trained classification model, wherein classifying the feature set comprises:
performing primary classification based on submovement analysis that finds Gaussian curves and breaks each curve into submovements; and
perform secondary classification that classifies the submovements into characters based on specific values of the extracted features.

12. The method of claim 11, further comprising boresighting based on differences in positions of the sensors with respect to the shaft.

13. The method of claim 11, wherein the extracted features include two or more of: mean, median, kurtosis, skewness, signal power, and inter quartile range.

14. The method of claim 11, wherein the trained classification model is a support vector machine.

15. The method of claim 14, further comprising changing configurable parameters of the support vector machine for a user based on a training sample of prescribed characters written by the user.

16. The method of claim 11, wherein the plurality of sensors includes at least one gyroscope and at least one accelerometer.

17. The method of claim 11, further comprising:
inserting a flexible rubber layer into an interior portion of the cap to reduce an effective diameter of the cap; and
attaching the cap to the distal end of the shaft.

18. The method of claim 11, further comprising:
predictively selecting one or more words based on the character and a dictionary; and
selecting a subsequent character based at least in part on the one or more words.

19. The method of claim 11, further comprising transmitting the sensor data, the feature set, the character, or a combination thereof to an external computing device.

* * * * *